(12) United States Patent
Calderone et al.

(10) Patent No.: US 7,039,074 B1
(45) Date of Patent: May 2, 2006

(54) N-WAY DEMULTIPLEXER

(75) Inventors: Theodore Calderone, San Carlos, CA (US); Mark J. Foster, Palo Alto, CA (US)

(73) Assignee: AGILETV Corporation, Menlo Park, CA (US)

( * ) Notice: Subject to any disclaimer, the term of this patent is extended or adjusted under 35 U.S.C. 154(b) by 1074 days.

(21) Appl. No.: 09/661,486

(22) Filed: Sep. 14, 2000

(51) Int. Cl.
*H04L 11/00* (2006.01)
*H04L 12/50* (2006.01)
*H04J 3/04* (2006.01)

(52) U.S. Cl. .................. 370/542; 370/375; 370/535
(58) Field of Classification Search .............. 370/407, 370/375–391, 428–468, 517–545; 341/50, 341/58, 59, 100, 101, 102; 365/73, 189, 365/230
See application file for complete search history.

(56) References Cited

U.S. PATENT DOCUMENTS

| | | | |
|---|---|---|---|
| 4,445,215 A | 4/1984 | Svendsen ................... 370/100 |
| 5,001,711 A * | 3/1991 | Obana et al. ................ 370/535 |
| 5,210,754 A * | 5/1993 | Takahashi et al. .......... 370/514 |
| 5,321,400 A * | 6/1994 | Sasaki et al. ............... 341/100 |
| 5,604,739 A * | 2/1997 | Buhrgard et al. ........... 370/468 |
| 5,726,990 A * | 3/1998 | Shimada et al. ............ 370/536 |
| 5,818,834 A | 10/1998 | Skierszkan ................... 370/366 |
| 5,923,653 A * | 7/1999 | Denton ....................... 370/375 |
| 6,009,107 A * | 12/1999 | Arvidsson et al. .......... 370/535 |
| 6,184,808 B1 * | 2/2001 | Nakamura ................... 341/95 |
| 6,369,614 B1 * | 4/2002 | Ridgway ..................... 326/93 |
| 6,668,292 B1 * | 12/2003 | Meyer et al. ................ 710/61 |
| 6,750,792 B1 * | 6/2004 | Azami et al. ............... 341/100 |

FOREIGN PATENT DOCUMENTS

| | | |
|---|---|---|
| EP | 0 576 711 A1 | 5/1994 |
| JP | 11-98022 | 9/1999 |
| WO | 02/23900 A2 | 3/2002 |

* cited by examiner

*Primary Examiner*—Man U. Phan
(74) *Attorney, Agent, or Firm*—Glenn Patent Group; Michael A. Glenn

(57) ABSTRACT

In the preferred embodiment of the invention, an output clock synchronizes an output CPU with an n-way demultiplexer to allow the demultiplexer to know which output is which. To do so, the invention provides a synchronization scheme in which a synchronization string is always written to channel zero before the output is allowed to be clocked. Once synchronization is established, each channel has its own word-length output buffer. Thus, each time the clock sends out a signal, a new word is put into the output buffer, unless it happens to be for channel zero which does not need a memory.

12 Claims, 5 Drawing Sheets

N-WAY DEMULTIPLEXER

BACKGROUND OF THE INVENTION

1. Technical Field

The invention relates to data transfer within a communications system, such as a digital television distribution network. More particularly, the invention relates to a technique for mediating data exchange rates among various components of a digital television distribution network by use of a novel n-way demultiplexer.

2. Description of the Prior Art

Agile TV of Menlo Park, Calif. has developed a system that uses an extremely powerful compute engine to perform various tasks, including speech recognition and Web browsing (see U.S. patent application Ser. No. 09/679,115, filed on Oct. 4, 2000, and entitled "SYSTEM, METHOD, AND NODE OF A MULTI-DIMENSIONAL PLEX COMMUNICATION NETWORK AND NODE THEREOF). Due to the very high computational capabilities of the compute engine, as well as its interconnected bandwidth, a single output processor is capable of outputting a continuous data stream on the order of 2.6 gigabits per second on a single output port. The preferred compute engine may be configured with anywhere from one to sixteen output ports, although a presently preferred configuration includes two output ports.

To place the figure of 2.6 gigabits per second in perspective, this represents 96 standard 6-MHz bandwidth video channels, which is equivalent to 750 to 1000 digital television channels depending on the type of modulation used.

A key challenge created by this large volume of data is to slow the data down to interface the compute engine to a variety of traditional cable head-end equipment, most of which operates at a much lower data rate. Further, the variance in cable television head-end configurations requires a great deal of flexibility in the number of video streams supported per interface.

It would be advantageous to provide a high performance, low cost method of distributing such high data rate output data to a number of different ports.

SUMMARY OF THE INVENTION

The invention provides a high performance, low cost method of distributing such high data rate output data to a number of different ports. Cable systems vary dramatically in the number of channels that they have to support. The invention provides a system that has the ability to have anywhere from one up to 96 different channels of output, while freely intermixing the number of channels that are bonded together under this output. For example, there can be one output having thirteen channels, another output having seven channels, another output having three channels, and another output having fifteen channels, and so on. The invention allows one to select the number of channels to be bonded together onto the output arbitrarily. This is useful in various applications that require different bandwidths. For example, in different architectures where the distribution of the signal varies, depending on the architecture of the specific cable headend.

An output clock synchronizes an output CPU with an n-way demultiplexer to allow the demultiplexer to know which output is which. To do so, the invention provides a synchronization scheme in which a synchronization string is always written to channel zero before the output is allowed to be clocked. Once synchronization is established, each channel has its own word-length output buffer. Thus, each time the clock sends out a signal, a new word is put into the output buffer, unless it happens to be for channel zero which does not need a memory.

An address counter controls the output buffer. When the address counter is counting it is pointing to one of 95 sixteen-bit shift registers that are associated with the output buffers. For example, channel one is written with a first word, then channel two, then channel three, then channel four, and then channel five—up to channel 95. When the counter wraps around to zero, the synchronization string is expected. The address counter continues to point at zero until the synchronization string is detected. Thus, the invention provides a mechanism that automatically re-synchronizes itself. For example, in the event that something goes wrong and synchronization is lost, the invention provides a mechanism that waits for a synchronization string and that then re-synchronizes on its own.

While the data are written to the shift register, the output clock is performing a shift register function. Thus, the data are input in parallel and then shifted out in serial. On the first clock edge the zero bit is shifted out, on the next clock edge the one bit is shifted out—up through fifteen. By the time the shift register reaches fifteen and it is time to output the next bit, the system has already written the next word to that set output. Thus, there are 95 television channels in digital form that are output from the shift registers.

In some cases it is desirable to have two or more channels on a single output. The invention uses the fact that there is storage for other channels next to a preceding channel. For example, consider an output 1 and an output 2, where data are stored into two shift registers. In the invention, the two shift registers are connected together, such that by the time the system finishes outputting the first word from output 1, it automatically starts outputting the word from output 2. This is accomplished by running a clock on output 1 and output 2 at twice the rate that the clock would normally run for just output 1. In this way, the system provides throughput for two channels while synchronization is maintained within the system. Any number of channels may be bonded using this technique.

DETAILED DESCRIPTION OF THE INVENTION

The invention provides a high performance, low cost method of distributing high data rate output data to a number of different ports.

Figure 1:
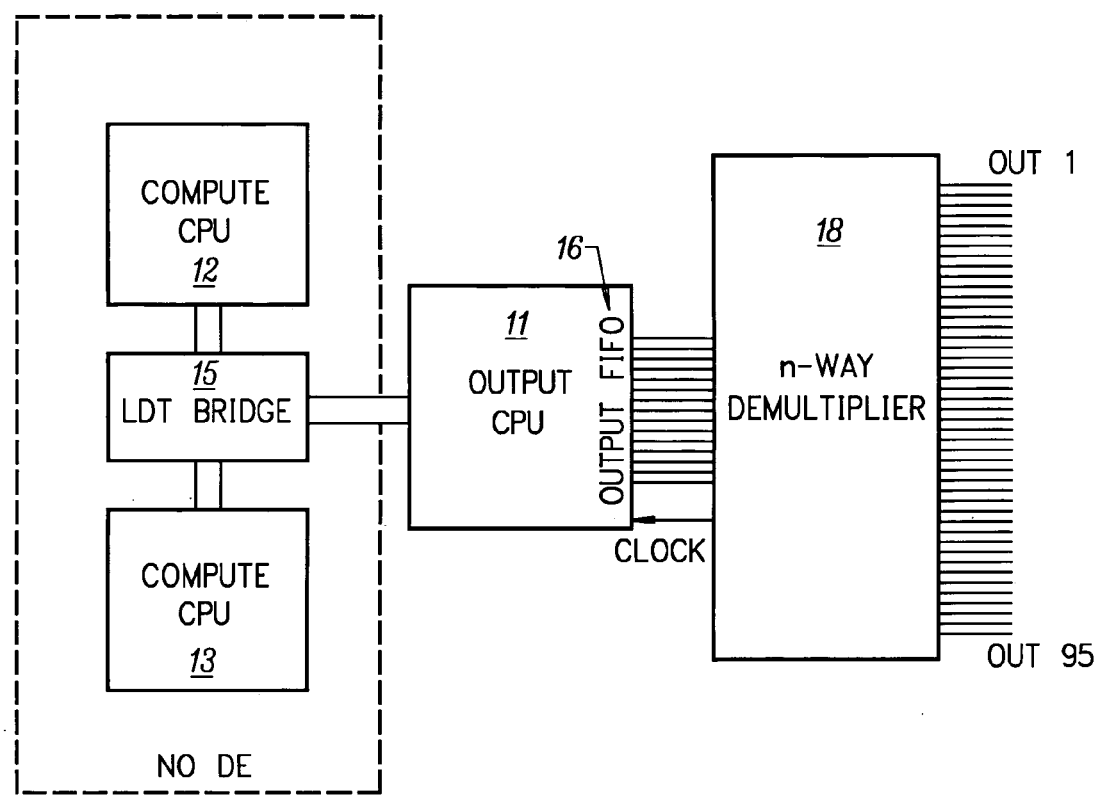
FIG. 1 is block schematic diagram of the output section of a communications system according to the invention.

FIG. 1 is block schematic diagram of the output section of a communications system according to the invention. In FIG. 1, an output CPU 11 is connected to a compute engine 12, 13 by a bridge circuit 15. Such circuits are very well known in the art. The system may comprise one or more CPU's.

This high speed bus provides 800 megabytes per second of bandwidth, thereby enabling sufficient connectivity to saturate the output port. It will be appreciated by those skilled in the art that other interconnect strategies may be used to implement the invention and that the implementation discussed herein is provided for purposes of example and not by way of limitation of the invention.

As shown in FIG. 1, the presently preferred output CPU actually contains two processor cores in a single package, although the method described herein is also relevant to single CPU systems. The output CPU contains a high speed, bi-directional 16-bit FIFO interface 16 which can be clocked at up to 160 MHz. At this data rate, the output CPU provides a full 2.6 gigabits of data per second to an n-way demultiplexer 18. It will be appreciated by those skilled in the art that, although the invention herein is described in connection with a specific output CPU, the invention is readily applied to other output devices.

Figures 2, 2A:
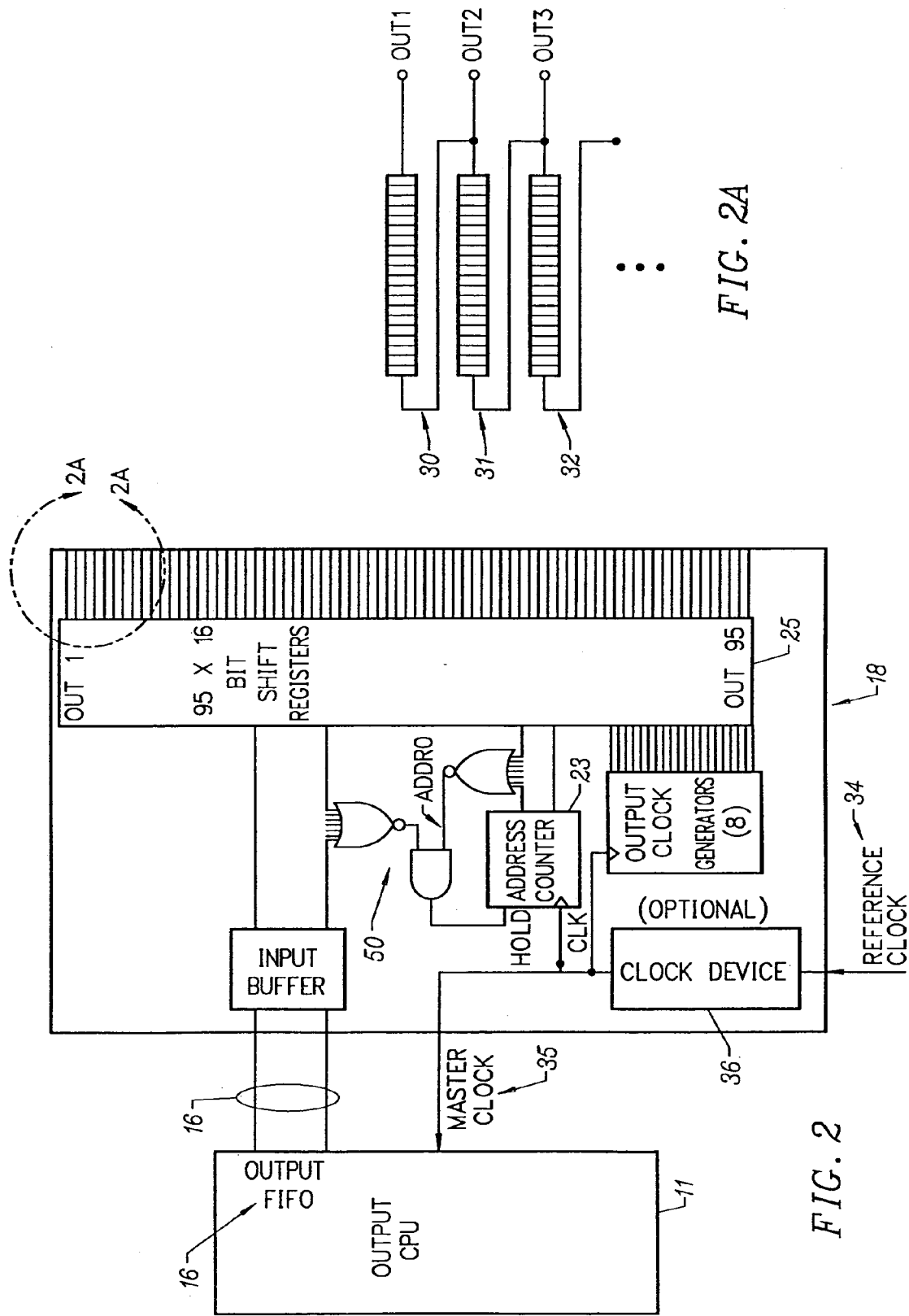
FIG. 2 is a block schematic diagram which provides an expanded view of the internal structure of an n-way demultiplexer according to the invention.

FIG. 2 is a block schematic diagram which provides an expanded view of the internal structure of an n-way demultiplexer 18 according to the invention. In overview, the major functional blocks of the demultiplexer include:

An output clock generator 35 which is fed to the output CPU's FIFO interface. The clock is used to transfer each word from the output CPU to the demultiplexer's inputs.

An address counter 23 that targets an output buffer associated with each output channel. In the preferred embodiment of the invention, 96 different output buffers are available.

Write logic that enables the current input word to be stored into the contents of the addressed output buffer.

Shift registers 25 connected to each output buffer that provide for the serial transmission of the stored word to the associated output pin. Each of the shift registers, e.g. 30, 31, 32, has a carry output which is connected to the carry input of the shift register in the next lower numbered output channel.

Clock generation logic 36 that provides for the generation of a variety of different output clocks. Eight different clocks are provided in the preferred embodiment of the invention. Each of these eight clocks may be programmed to be an integral divisor of a reference clock 34. The reference clock may be either identical to the output clock 35 provided to the output CPU's FIFO, or it may be an integer multiple of that clock. If the reference clock is run at the CPU's output clock rate, the clock divisors may range from 1–96, enabling from one (with a divisor of 96) to 96 (with a divisor of one) output channels. If the reference clock is run at an integer multiple of the output clock associated with the output CPU, then the divisor ranges must support the same range mentioned above, multiplied by the degree b which the speed increase of the reference clock is greater than the output CPU's FIFO clock. For example, the reference clock could be run as high as sixteen times the CPU's output clock. In this case, the clock divisor ratios must range from 1 to 96*16.

Figure 3:
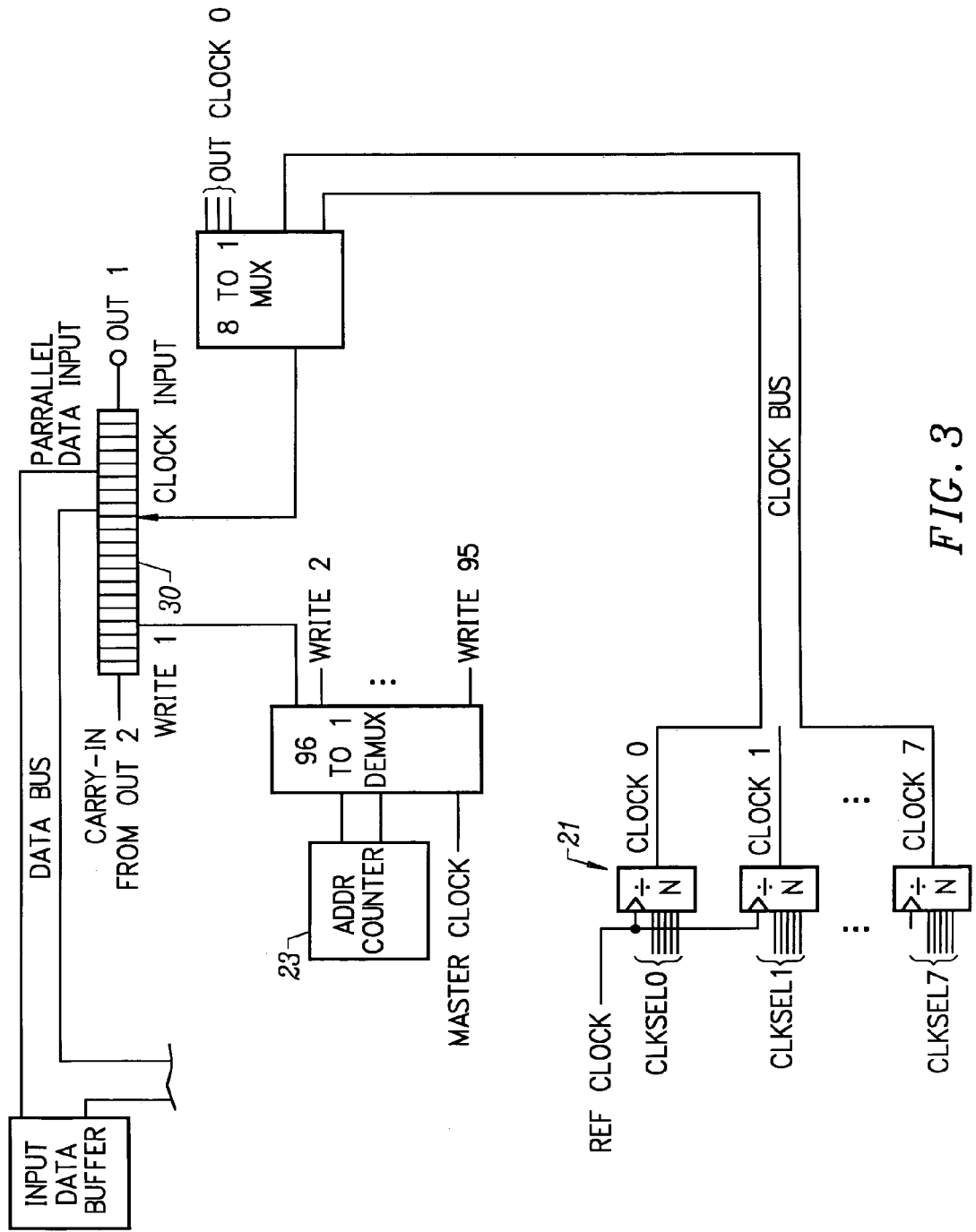
FIG. 3 is a detailed block schematic diagram of the n-way demultiplexer of FIG. 2 showing a first preferred clock selection logic circuit according to the invention.
Figure 4:
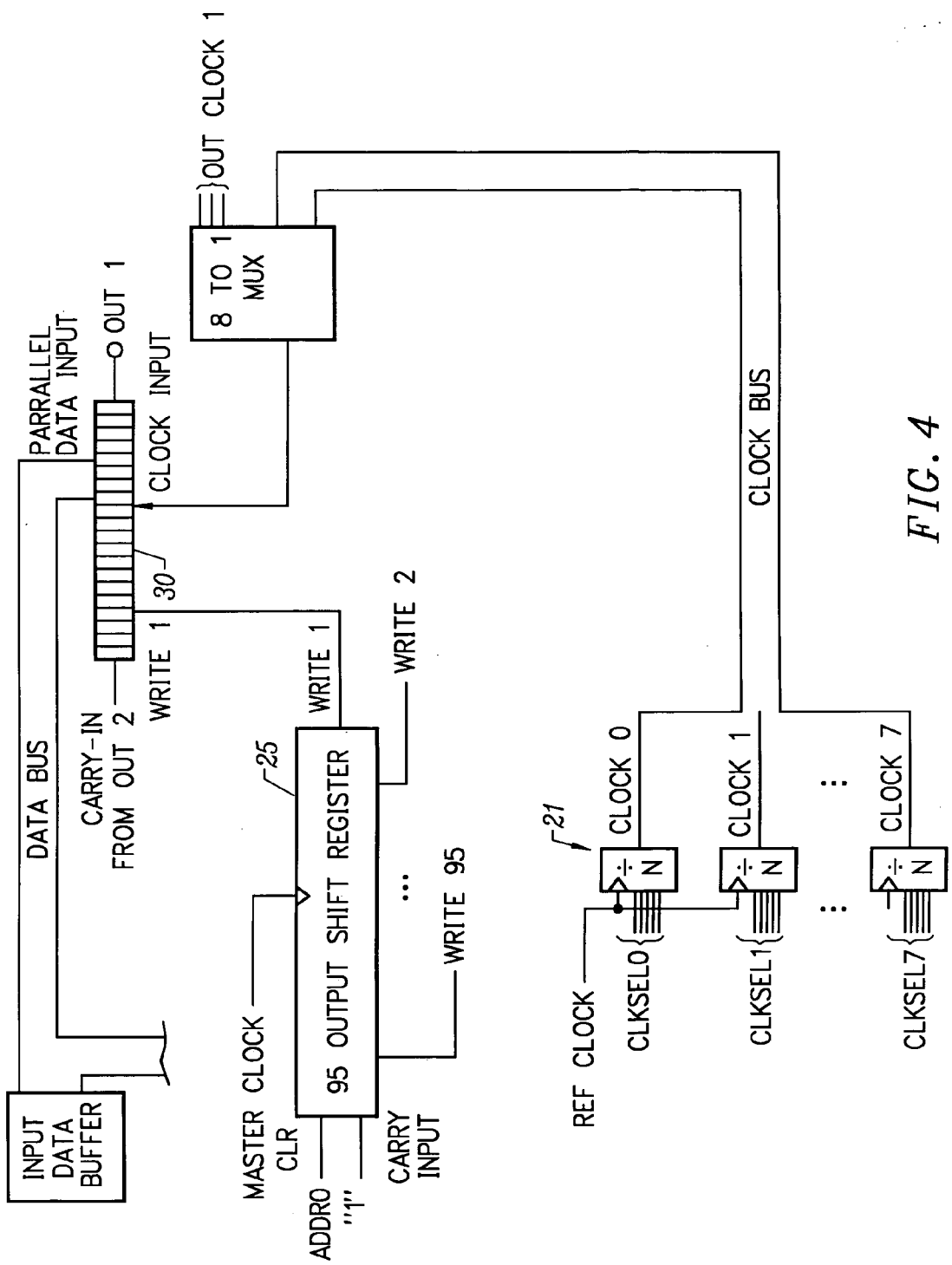
FIG. 4 is a detailed block schematic diagram of the n-way demultiplexer of FIG. 2 showing an alternative, equally preferred clock selection logic circuit according to the invention.

Clock selection logic associated with each individual output stage, which enables each output to be run at one of the eight different clock rates, independently of the other outputs. FIGS. 3 and 4 provide more detailed block schematic diagrams showing alternative clock selection logic according to the invention.

FIG. 3 is a detailed block schematic diagram of the n-way demultiplexer of FIG. 2, showing a first preferred clock selection logic circuit. FIG. 4 is a detailed block schematic diagram of the n-way demultiplexer of FIG. 2, showing an alternative, equally preferred clock selection logic circuit. In FIGS. 3 and 4, the shift register 30 has a carry input connected to the output OUT 2 and a clock input from one of the eight different clocks 21 provided by the clock generation logic 36 shown in FIG. 2. The address counter 23 controls the output buffers and points to one of the 95 shift registers 25 associated with the output buffers while data is written to the specific shift register 30.

In the preferred embodiment of the invention, channel 0 is reserved for the detection of synchronization information. Synchronization is necessary to ensure that the next word transferred between the output CPU and the n-way demultiplexer is written to the proper output buffer. Because the FIFO output does not contain address information it is necessary to synchronize the implicit address associated with the output CPU's data with the address counter in the demultiplexer. Thus, the address counter is inhibited from advancing past address 0 until channel 0 is written with a synchronization string having a value of OFFFFH via hard-wired logic 50. It will be appreciated by those skilled in the art that any other synchronization string may be provided as desired.

Figure 5:
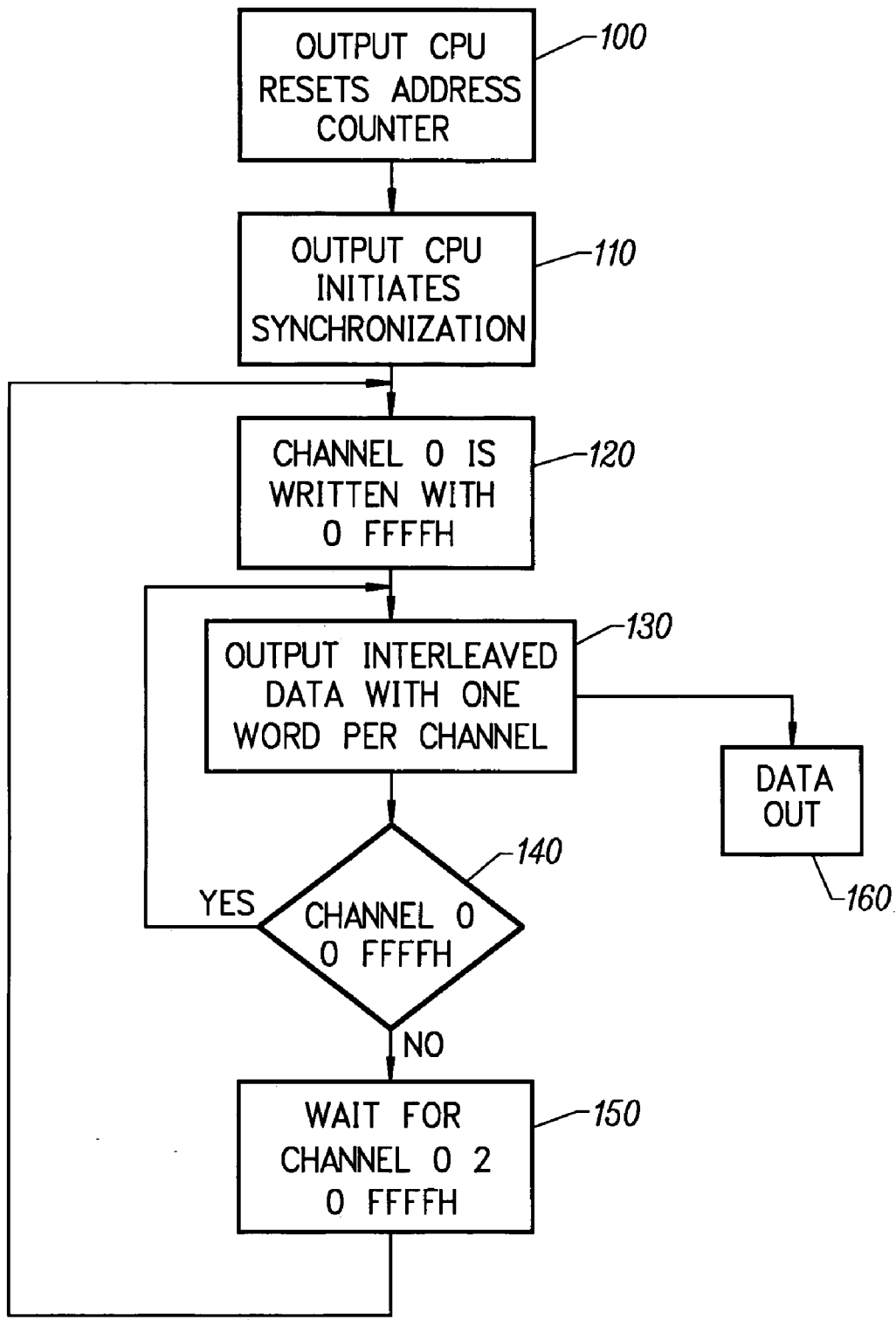
FIG. 5 is a flow diagram showing an example of a preferred synchronization sequence according to the invention.

The following is an example of a preferred synchronization sequence (see FIG. 5):

The output CPU initially creates a data stream consisting of 95 words of 0, and sends this data through the FIFO interface (100). This ensures that the address counter in the demultiplexer is reset, regardless of its initial condition.

Following the initial string of 0s, the output CPU writes a stream of multiplexed channel information with one word per channel (110). Channel 0 is always written with OFFFFH, which is a string that is used to initiate synchronization (120). It will be appreciated by those skilled in the art that the initialization string is a matter of choice and need not be OFFFFH.

During normal operation, the output CPU interleaves data from all 95 of the current output channels together, with one word per channel (130). Prior to issuing these data to the FIFO, the CPU always writes a value of OFFFFH initially (120), thereby maintaining synchronization. This pattern repeats indefinitely.

If at any time channel 0 is written with any value other than OFFFFH (140), the address counter continues to hold at 0 (150). Only after the address counter is written with OFFFFH is the count permitted to advance to the active output channel and data are output (160).

In the event that loss of synchronization occurs (150), FIFO data are repeatedly written to channel 0 until a value of OFFFFH appears in the stream 120). Note that this does not inherently guarantee immediate synchronization, but it takes no more than a few loops through the counter outputs before synchronization occurs, typically within a matter of milliseconds.

In addition to the synchronization scheme discussed above, the n-way demultiplexer provides another important capability, i.e. the demultiplexer may be configured to support anywhere from one to 95 channels on its serial outputs in a manner which is substantially transparent to system software. Each cable system may require a different number of channels to be multiplexed onto each serial output stream. The n-way demultiplexer enables the number of channels that are bonded together to be set independently for each output channel.

To accomplish this task, at system initialization each output channel is configured to run at an appropriate clock rate. To bond channels together, it is only necessary to select the same rate for sequential output channels, and then the lowest numbered channel's output is actually used for output, while the remaining output pins are ignored. For example, if it is necessary to bond eight outputs together into a serial data stream, inputs 10–18 could all be programmed with a clock divisor (96/8=12), meaning that they are clocked at a rate which is $1/12^{th}$ that of the CPU's FIFO clock.

Once data are written to these outputs as described above, the data that have been written begin serially clocking out to the output pin. In the case of channel 10, the first sixteen clocks produce the data for channel 10, as expected. However, continued clocking then produces the output data for channel 11, then channel 12, and so on. This occurs due to the carry-in carry-out connections described above (see buffers 30, 31, 32 on FIG. 2). Note that it is not necessary to change anything other than the output clock selection when bonding channels. Even though the carry input of the highest numbered channel in the group is still connected to a different output group, the data shifted in are never propagated onto the output pin, so it may be safely ignored.

Due to the interdependence between output groups, any number of channels may be bonded together in any number of groups. This provides superior flexibility in a broad variety of environments and at very low cost.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for distributing high data rate output data to a number of different ports, comprising the steps of:
   providing an output module having a plurality of different output channels;
   providing a demultiplexer in communication with said output module for receiving said output channels;
   providing an output dock for synchronizing said output module with said demultiplexer; and
   providing a synchronization scheme in which a synchronization string is always written to a particular channel before said output channels are allowed to be clocked.

2. The method of claim 1, further comprising the step of:
   bonding together any predetermined number of channels for each of said ports independently of each of said other ports.

3. The method of claim 1, further comprising the step of:
   providing each output channel with its own output buffer;
   wherein, once synchronization is established, each time said clock sends out a signal, a new word is put into an appropriate output buffer.

4. The method of claim 3, further comprising the step of:
   providing an address counter for controlling each said output buffer;
   wherein said address counter waits for said synchronization string before counting through each of said output buffers.

5. The method of claim 4, further comprising the step of:
   providing a shift register associated with each said output buffer for receiving data in parallel as an input and for outputting said data in a serial fashion to an associated output buffer.

6. The method of claim 5, further comprising the steps of:
   connecting said shift registers together, such that by the time a first word is output from a first output buffer a next word may begin being output from said first output buffer; and
   running a clock on said first output buffer and said next output buffer at a multiple of a rate that said clock would normally run for just said first output buffer.

7. An apparatus for distributing high data rate output data to a number of different ports in a system having an output module having a plurality of different output channels, said apparatus comprising:
   a demultiplexer in communication with said output module for receiving said output channels;
   an output clock for synchronizing said output module with said demultiplexer; and
   a synchronization scheme in which a synchronization string is always written to a particular channel before said output channels are allowed to be clocked.

8. The apparatus of claim 7, further comprising:
   means for bonding together any predetermined number of channels for each of said ports independently of each of said other ports.

9. The apparatus of claim 7, further comprising:
   an output buffer each output channel;
   wherein, once synchronization is established, each time said clock sends out a signal, a new word is put into an appropriate output buffer.

10. The apparatus of claim 9, further comprising:
    an address counter for controlling each said output buffer;
    wherein said address counter waits for said synchronization string before counting through each of said output buffers.

11. The apparatus of claim 10, further comprising:
    a shift register associated with each said output buffer for receiving data in parallel as an input and for outputting said data in a serial fashion to an associated output buffer.

12. The apparatus of claim 11, wherein said shift registers are connected together, such that by the time a first word is output from a first output a next word may begin being output from said first output; and further comprising:
    a dock for clocking said first output and said next output, said clock running at a multiple of a rate that said clock would normally run for just said first output.

* * * * *